US008926330B2

(12) United States Patent
Taghavi

(10) Patent No.: US 8,926,330 B2
(45) Date of Patent: Jan. 6, 2015

(54) TACTILE COMMUNICATION DEVICE FOR THE NECK

(76) Inventor: Reza Taghavi, St. Paul, MN (US)

( * ) Notice: Subject to any disclaimer, the term of this patent is extended or adjusted under 35 U.S.C. 154(b) by 120 days.

(21) Appl. No.: 13/509,634

(22) PCT Filed: Mar. 25, 2011

(86) PCT No.: PCT/US2011/000545
§ 371 (c)(1),
(2), (4) Date: May 14, 2012

(87) PCT Pub. No.: WO2011/119233
PCT Pub. Date: Sep. 29, 2011

(65) Prior Publication Data
US 2013/0115579 A1      May 9, 2013

Related U.S. Application Data

(60) Provisional application No. 61/340,966, filed on Mar. 25, 2010, provisional application No. 61/397,336, filed on Jun. 10, 2010, provisional application No. 61/397,621, filed on Jun. 14, 2010.

(51) Int. Cl.
G09B 19/00    (2006.01)
A63F 13/98    (2014.01)
G06F 3/01     (2006.01)

(52) U.S. Cl.
CPC .............. *G09B 19/003* (2013.01); *A63F 13/02* (2013.01); *G06F 3/016* (2013.01); *A63F 2300/302* (2013.01)
USPC .......................................... 434/114; 434/112

(58) Field of Classification Search
CPC ...................................................... G09B 21/003
USPC .................................. 434/112, 113, 114, 246
See application file for complete search history.

(56) References Cited

U.S. PATENT DOCUMENTS

| | | | |
|---|---|---|---|
| 5,568,127 A * | 10/1996 | Bang | 340/575 |
| 5,701,356 A * | 12/1997 | Stanford et al. | 381/385 |
| 6,603,863 B1 * | 8/2003 | Nagayoshi | 381/380 |
| 8,300,862 B2 * | 10/2012 | Newton et al. | 381/314 |
| 2007/0053523 A1 * | 3/2007 | Iuliis et al. | 381/77 |
| 2007/0203433 A1 * | 8/2007 | Murphy | 601/15 |
| 2009/0167677 A1 * | 7/2009 | Kruse et al. | 345/156 |
| 2012/0092460 A1 * | 4/2012 | Mahoney | 348/46 |

* cited by examiner

*Primary Examiner* — Bruk Gebremichael
(74) *Attorney, Agent, or Firm* — Eggink & Eggink; Anthony G. Eggink; Katrina M. Eggink

(57) ABSTRACT

A device comprised of a plurality of evenly spaced tactile actuators arranged in the form of a generally C-shaped structure and worn snug around the neck by a subject to apply tactile stimuli to the subject's neck skin. An electronic controller operated by a computer program controls the actuators of the device based on signals received from an external source. The device impresses sequences of tactile stimuli around the subject's neck to provide intelligible information, cues and warnings or certain game-related sensations.

19 Claims, 6 Drawing Sheets

Table 1
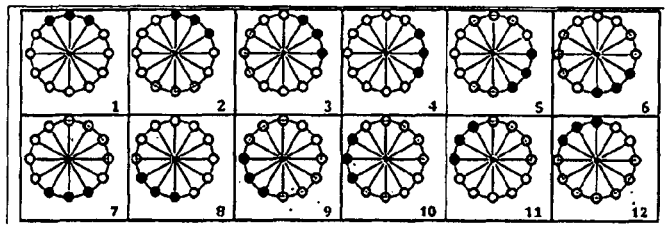
FIG 11
Table 2
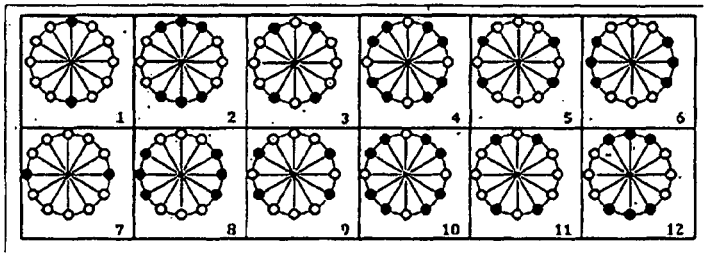
FIG 12
Table 3
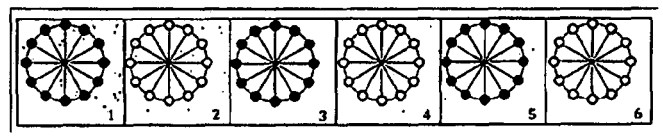
FIG 13
Table 4
FIG 14

TACTILE COMMUNICATION DEVICE FOR THE NECK

This Application claims the benefit of U.S. Provisional Application Ser. No. 61/340,966, filed on Mar. 25, 2010; U.S. Provisional Application Ser. No. 61/397,336, filed on Jun. 10, 2010; U.S. Provisional Application Ser. No. 61/397,621, filed on Jun. 14, 2010, and PCT Application Serial No. US2011/00545, filed on Mar. 25, 2011 respectively.

BACKGROUND OF THE INVENTION

This invention relates generally to man-machine interaction and tactile communication. Particularly, this invention relates to the communication of precise and intelligible information or sensations utilizing a device placed around the neck of a person and using tactile actuators to stimulate the neck skin from various angles or peripheral locations.

The five senses of a human provide an individual with cues about location, distance, velocity, acceleration and other properties of surrounding items. In simulated or virtual worlds such as electronic video games, the senses are restricted by the limited size of the video screen, low sound quality and the limited tactile sensations provided by the vibration of a hand-held controller, for example.

Vibrating game controllers are known and have been devised (Nishiumi, Koshima and Ohta, 2006) and used to create, in the player, a sense of interaction with the physical world. For instance, in a car racing game, as the vehicle leaves the pavement, the hand-held game controller vibrates. In first person shooter games, the subject may be informed of having been hit by a projectile through the vibration of the game controller, for example. With the advent of controller-less game systems, the prior art means by which tactile information was provided to the subject has been further limited because these new systems no longer enable user interaction using hand-held controllers (pad, joystick, etc.). The KINECT gaming system developed by the Microsoft Corporation is an example of a controller-less game system. Thus, a need exists in the art to provide detailed tactile information to a video game player, for example.

Tactile Communication

Tactile communication methods, systems and devices have been devised to provide an individual with the ability to understand text and commands, or to augment situational awareness. These inventions primarily relate to artificial vision for the blind (MIT Touchlab, 2005) and to remote communication with individuals (Gilson & Christopher (2007), Rupert & Kolev (2008) and Zelek & Holbein (2008)).

Tactile displays, as the visual-to-tactile information translation is often called, have been extensively investigated by research organizations such as the MIT Touch Lab (MIT Touchlab, 2005).

Research and prior art in the area of tactile displays has generally been concentrated around passing tactile information to the skin, and the mechanical and physiological parameters that limit the complexity and bandwidth, (amount of information per unit time) that can be transmitted with no particular interest in the neck skin as a high-resolution sensory organ.

The Tactile Situation Awareness System (TSAS) is a wearable tactile display intended to provide spatial orientation cues (Zelek & Holbein, 2008; Rupert & Kolev, 2008). A belt equipped with transducers and worn around the waist (Gilson & Christopher, 2007) was devised to provide orientation cues to soldiers. This prior art uses tactile stimulus at various positions around the torso and the belt area to pass on information on the location of an incoming threat to the subject. However, the neck skin as a high-resolution sensory organ was not considered or suggested.

The Neck Skin as a High-Resolution Sensory Organ

One measure of the effectiveness of a form of communication is how fast complex information can be communicated to an individual through a specified form of communication. In information theory, this is typically measured by how many characters can be communicated to an individual, and at what rate these characters can be comprehended by the individual.

The skin of an untrained individual is an imprecise sensory organ. While a person can discriminate between tactile stimuli applied to individual fingers, toes, other body parts or far-apart skin locations, the ability to discriminate between neighboring skin locations is greatly limited. However, tactile stimulus applied at various angles or peripheral locations around the neck can be discerned despite the closeness of the application points. An untrained individual is often capable of discriminating as many as 8 to 12 different angular or peripheral locations around his or her neck (FIG. 2). A simple test shows that an individual may be trained to distinguish the location of tactile stimuli applied to many more angular or peripheral locations around the neck.

Consider a horizontal clock face 28 facing up and centered on the subject's neck (FIG. 2). If the clock is oriented in such a way that 12 o'clock points towards the front of the subject, one can devise an experiment where the neck of the subject is touched at various angular or peripheral locations around the neck and the subject names the hour mark corresponding to the point of contact. For instance, when the subject is touched straight behind the neck, he or she will say: "6 o'clock". An untrained subject can, in general, "tell apart" or distinguish each of the 12 hour marks. This ability to distinguish the 12 different angular or peripheral locations corresponds to a resolution of 12 or, in digital terms, between 8 ($=2^3$, or 3-bit resolution) and 16 ($=2^4$, or 4-bit resolution).

With such a resolution, an individual is not only able to tell directions but can also distinguish between combinations of stimulation points. By simultaneously stimulating several locations around the neck, with some training, it is then possible to communicate complex information to an individual simply through tactile communication (see Table 1, Table 2, Table 3, and Table 4 shown and discussed below).

The neck skin has a unique property that enables a person to accurately discriminate tactile stimuli applied from various directions onto its surface. The present invention exploits this discriminatory stimuli property to convey information and sensations to a subject immersed in a simulated or virtual world such as an electronic video game. Embodiments of the invention utilizing this methodology of tactile stimuli may also be used, for example, to communicate with pilots, the blind, the autistic, musicians and those unable to communicate verbally or visually.

SUMMARY OF THE INVENTION

The invention provides a device comprised of a plurality of tactile actuators (solenoids, micro-vibrators, motors, buzzers, speakers, hot/cold sources, electrodes, and the like) arranged at regular intervals in a semi-circle and worn snug around the neck by the subject. An electronic controller powered by a power source, such as a small rechargeable battery pack, and operated by a computer program that operates the device based on signals received from an external source through a Bluetooth or similar wireless receiver. Based on signals received from the external source, which may be a video game console, computer or mobile communication device, for example, the controller commands the device to impress sequences of tactile stimuli at specified locations around the subject's neck, thereby providing the subject with intelligible game-related information, cues and warnings or game-related sensations.

The device is constructed generally in the form of a pair of headphones connected by flexible and spring-loaded metal strips resting around the neck of a user. Actuators are positioned in an extensible and adjustable holster that may be shortened or elongated based on how far the metal strips are pulled out of the sleeve, to provide equidistantly spaced actuators independent of the subject's neck size. The design structure ensures that it is properly oriented (front facing to the front of the subject), and that the same size device can fit individuals of varying neck sizes. Furthermore, the device may be combined with a pair of speaker/headphones and a microphone, to provide a complete sensory audio-visual and tactile environment to the user.

A benefit of the present invention, embodied as a collection of equally-spaced actuators worn as an adjustable and comfortable generally C-shaped collar worn snug around the neck is to provide an additional sensory channel through which game-related sensations and stimuli can be transmitted to the subject to substantially enhance the subject's gaming experience.

Another benefit of the invention is to provide a device which allows individual players during video gaming to receive private communication from the game console and to be rewarded.

A further benefit of the invention is to provide a device which may provide rhythmic tactile patterns as an accompaniment to music, for example, as a tactile metronome to provide organized tactile patterns or marquis patterns for use by musicians, dancers, singers, etc. or by providing a tactile feel of music through a one-to-one mapping between each note of a song and each actuator. The device may further be utilized as a means for the deaf to sense music.

An advantage of the invention is to provide small microvibration motors as vibrating actuators and pulse-operated motors to cause gentle rubbing against the skin.

Another advantage of the invention is to provide semaphores for representing the distance and bearing of a target, and semaphores for conveying a sense of acceleration. Distance may be represented by turning groups of actuators on and off at a certain frequency or by varying the electrical current input to the actuators. Acceleration may be represented by activating groups of actuators to represent pressure due to acceleration.

These and other benefits of this invention will become apparent from the following description by reference to the drawings.

BRIEF DESCRIPTION OF THE DRAWINGS

FIGS. 11-14 show Tables 1-4 which are examples of tactile or marquis patterns.

DESCRIPTION OF THE PREFERRED EMBODIMENTS

Figure 1:
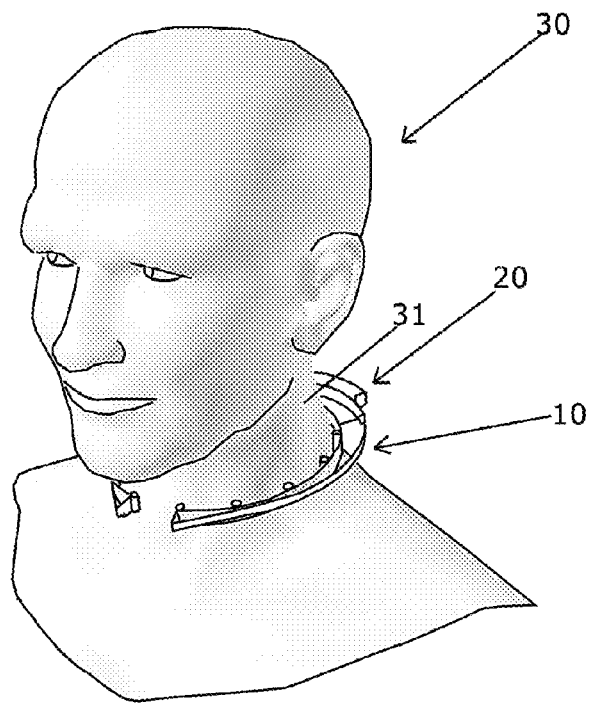
FIG. 1 is a perspective view showing the tactile communication device of the present invention worn around the neck of a subject.

The present invention relates to a tactile communication device for the neck of a user. The skin of the neck as a high-resolution sensory organ is discussed above. FIGS. 1-10 show the structure of the device and its operation. Tactile patterns or Marquis Patterns are discussed as a means of communicating certain sensations in a simulated or virtual environment and examples of Marquis Patterns are discussed with respect to Tables 1-4 set forth below. Applications of the invention are further discussed with respect to the drawing FIGS. 1-10 and the Tables 1-4.

FIG. 1 shows the device 10 of the invention embodied as a collection of equally-spaced actuators 11 worn as an adjustable, and comfortable C-shaped collar worn snug around the neck 20 of a subject 30. The device 10 provides an additional sensory channel through which game-related sensations and stimuli can be transmitted to the subject in order to substantially enhance the subject's gaming experience. The device 10 is shown disposed around the neck not unlike a pair of headphones that are not in use. The open C shape of the device 10 and its adjustable structure provides a fit for a range of neck sizes and which is properly oriented, namely, open end facing the larynx or Adam's apple of the subject 30.

Figure 2:
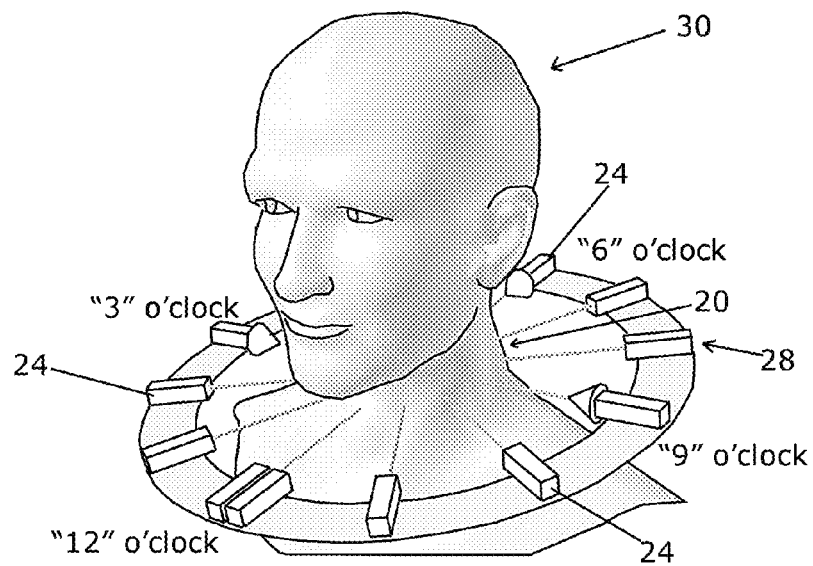
FIG. 2 is a perspective view showing a subject with a peripheral pattern of stimuli corresponding to the face of a clock.

FIG. 2 shows a clock face 28 with 12 directions with respect to the subject's neck orientation. The design of the device ensures that it remains properly oriented with respect to the subject's neck 20. 12 o'clock corresponds to the front actuator 24 and 6 o'clock refers to the back actuator 24 of the subject's neck 20.

Figure 3:
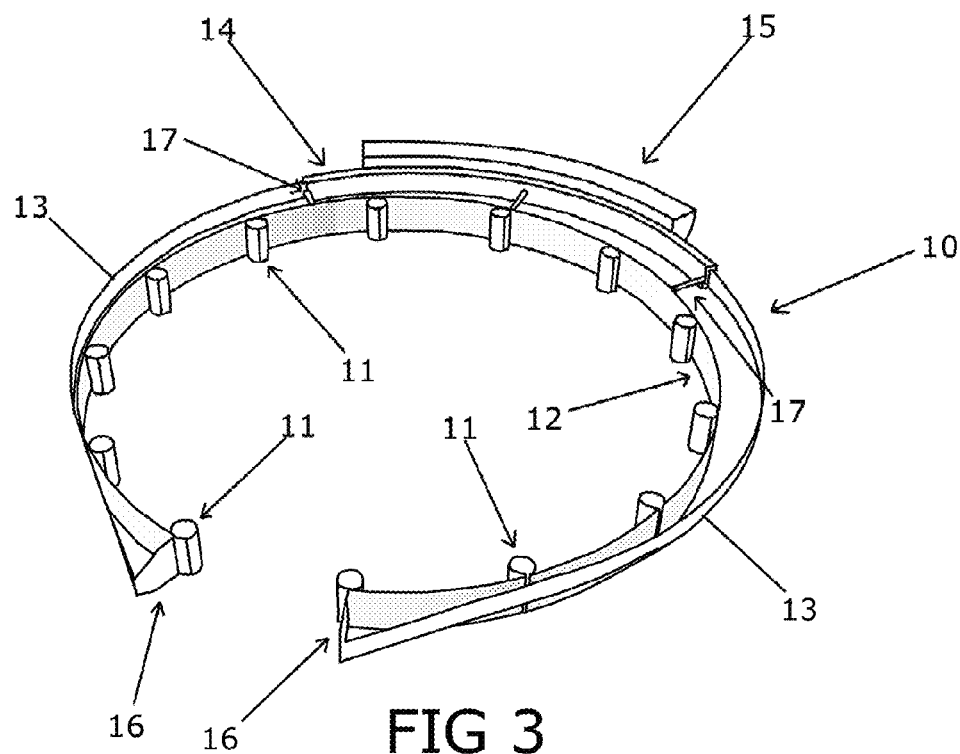
FIG. 3 is a perspective view showing the construction of the device of the invention.

FIG. 3 shows the device 10 structure to be a generally solid skeleton constructed of two curved metal strips 13 sliding from a solid sleeve 14. The skeleton maintains a flexible holster 12 to hold a plurality of actuators 11 taut around the subject's neck 20, as shown in FIG. 1. The device 10 may be adjusted to different neck sizes by pushing or pulling the metal strips 13 in and out of the sleeve 14.

The holster 12 may be constructed of an elastic textile material or the like, and having a plurality of equally spaced actuators 11. The holster 12 is shown to have 13 actuators 11, with the two forward actuators 11 operating in unison. The latter being similar to placing 12 actuators 11 on a circle with one actuator being placed on the front of the neck, however, in this embodiment of an open C design, the 13 actuator design is an approximation of a 12-actuator design.

The holster 12 is shown anchored at its ends to the free ends of the metal strips 13 by means of two solid or rigid anchors 16. The anchors 16 ensure that when the device 10 is worn, the holster 12 remains taut and snug around the subject's neck 20. The holster 12 is maintained aligned with the sleeve 14 and the metal strips 13 by means of three springs 17 which ensure that the holster 12 remains taut, close to the sleeve 14 and spaced from the neck. When the device 10 is worn, the skeleton comprised of the sleeve 14 and the metal strips 13 ensures that the holster 12 and the actuators 11 fit snug around the neck 20 while leaving the frontal area around the subject's Adam's apple open, thereby ensuring that the subject doesn't feel "choked" by the device.

Figure 4:
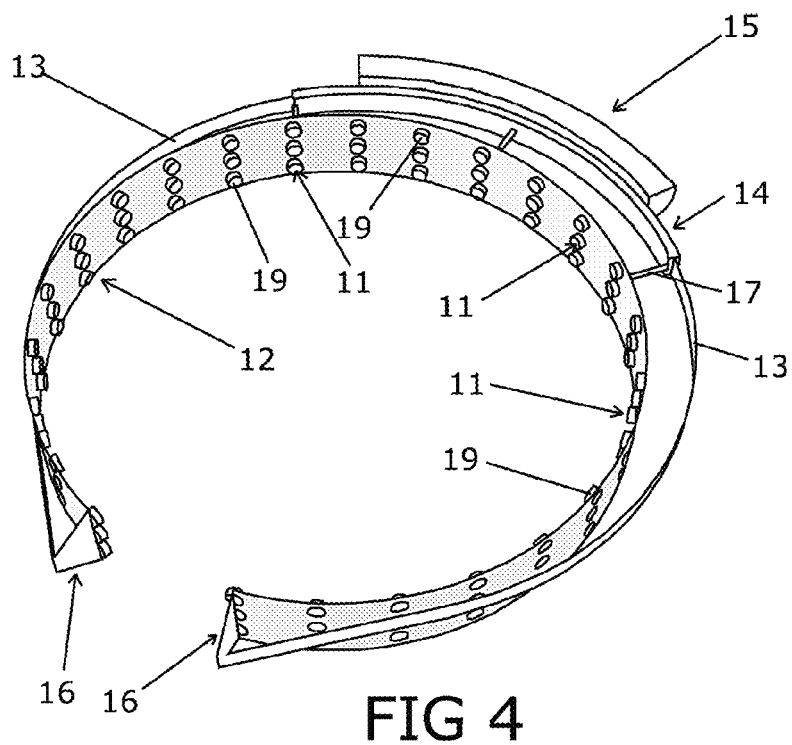
FIG. 4 is a perspective view showing an alternative construction of the device of the invention.

FIG. 4 shows an alternate design constructed similar to the device 10 of FIG. 3. However, instead of 13 actuators 11 placed at equal distance along the holster 12, three rows of 25 actuators 19 are placed on the holster 12. The 75 actuators 19 can convey a richer set of information to the subject by relying on the subject's ability to discriminate between three actuators located at the same angular or peripheral location and at three different heights on the neck skin.

The actuators 11 are in communication with the electronics contained within the contoured box 15. The contoured electronic box 15 is shown attached to the back of the sleeve 14 and which houses the electronics, i.e., batteries, Bluetooth and radio or transmission devices utilized for the operation of the device. The communication may be wireless or via wires extending from box 15 through springs 17 and through the flexible holster 12 material to each actuator 11. The contoured box 15 is a containment structure for housing the elements that provide the control mechanism or control unit for the tactile actuators of the tactile communication device of the invention.

The actuators 11 may have a number of embodiments and structures. For examples, as shown in FIG. 3, the generally cylindrical structures may be flexible and deformable to thereby permit a small, or variable, force from within the cylindrical actuator to "touch" the user's neck skin. Alternately, the cylindrical structure may be movable from and with respect to the holster 12 to thereby impart a "touching" force to the user's neck skin. In a similar manner, a vibration may be provided from within the actuator body or by the movement of the actuator body itself. The actuators 11 of FIG. 4 are shown to be formed of cylindrical, button-like shapes which may also move or be moved in a similar manner described with respect to the actuators of FIG. 3. The actuators may also be structured so as to impart a small electrical discharge or to provide a temperature change to the neck skin of the user.

Figure 5:
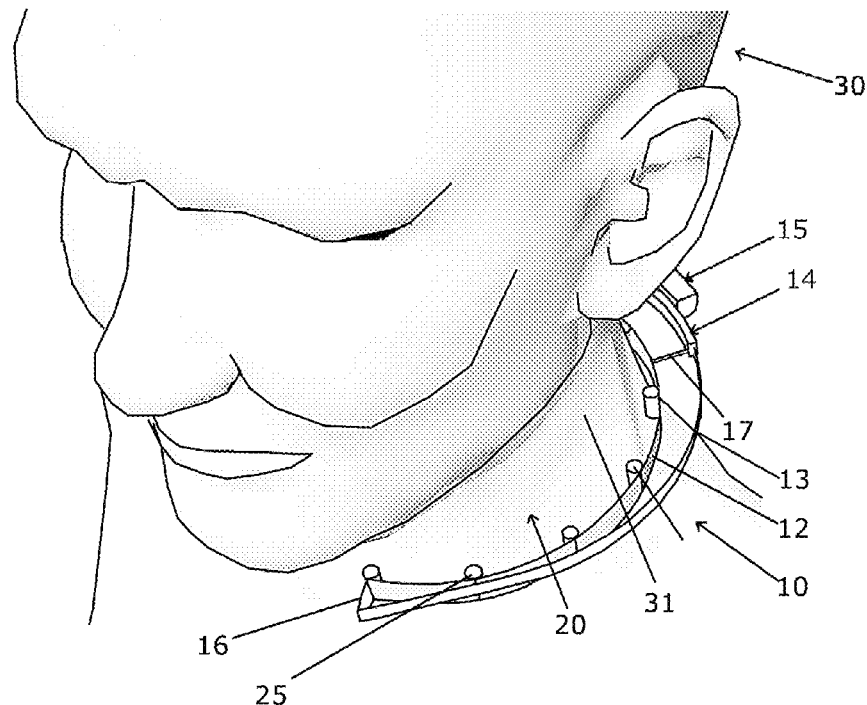
FIG. 5 is a perspective view showing a subject wearing the tactile communication device of the invention utilizing pulsing actuators.

In summary, the tactile stimulators 11 as shown and described with respect to FIGS. 3-5 may have various structures and may be disposed with respect to the neck skin in various patterns. For example, the stimulators are preferably equidistantly spaced and extend from the inside periphery of the holster which is adjustably placed about the user's neck circumference. The stimulators are positioned to angularly or peripherally touch the neck skin of the user. The tactile stimulators may also be constructed and arranged to tangentially rub, vibrate or touch from an oblique angle, apply a change in temperature, or provide a small electric discharge to the neck skin. The spacing of the actuators as well as the number of columns and rows of actuators shown and described herein are exemplary and may vary. Further, the structure of the device 10 and its adjustability are exemplary. The important aspect of the invention being the tactile communication provided by the actuators held to the neck skin of the subject.

FIG. 5 shows the device worn around a user's neck 20 having actuators or pulse motors 25 that are mounted at hinge-like connection 27 to the inside of the flexible holster 12 and spaced around the user's neck. The hinge-like connection 27 allows the actuators or motors 25 to rotationally move with respect to the holster 12 body structure. The pulsing of the motor 25 causes a gentle rub against the neck skin 31 as power is suddenly delivered to the motor 25. Similar to that of FIG. 1, device is shown having a generally solid skeleton constructed of the curved metal strips 13 that slide into solid sleeve 14. Flexible holster 12 is shown carrying motors 25 and held taut on the user's neck by metal strips 13. Anchors 16 ensure that holster 12 remains about the user's neck and a contoured electronic housing or box 15 is shown attached to sleeve 14 and which contains the electronics for the device for communication between the spaced motors 25 and the electronics in box 15 via wires or wirelessly.

Figures 6A, 6B, 6C:
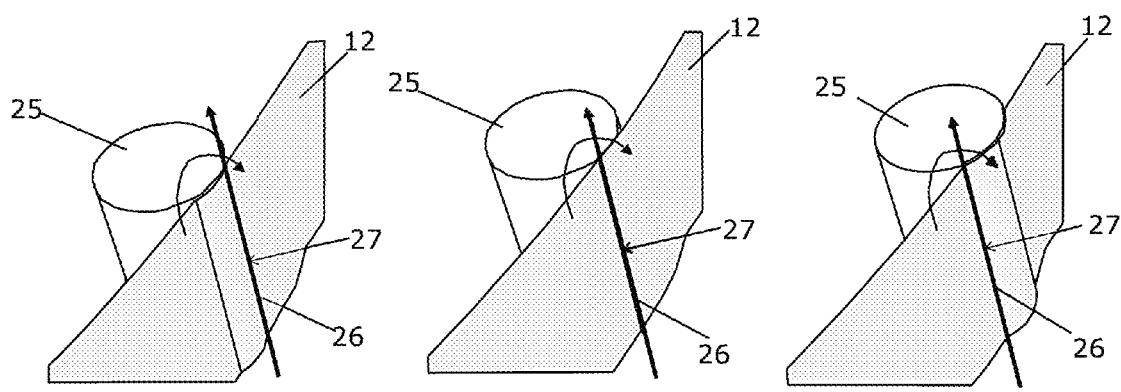
FIGS. 6A-6C are perspective views showing successive rotating positions of the pulsing actuator of FIG. 5.

FIGS. 6A-6C show three successive positions of a motor 25 as the body or stator of the motor rotates about the hinge axis depicted by a vector 26, thereby gently rubbing against the neck skin of the device user. Each motor or actuator 25 is shown attached to holster 12 in a manner so that the attachment point acts as a hinge 27, enabling the body of motor 25 to rotate as a result of the initial power-up torque to the motor and to thereby rub the user's neck skin 31.

Figure 7:
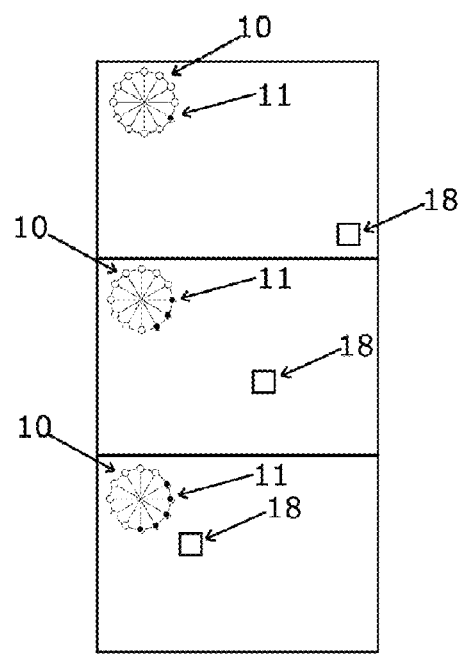
FIG. 7 is a depiction of a target approaching the device of the invention.

FIG. 7 shows how the device 10 may be used to communicate the direction (bearing) and the distance (range) of a target 18 to the subject. From top to bottom, as the target 18, represented by a square, approaches the subject from the South-East, the number of active actuators 11 (represented by black dots) increases. Far away, only one actuator 11 pointing to the direction of the target is active. As the target approaches, the patch of active actuators 11 enlarges, with the average direction of the patch pointing towards the target 18. When the target 18 is the closest to the subject, nearly half of the actuators in the direction of the target are active. The relationship between the number of active actuators and distance described herein is exemplary and may vary.

Semaphores for Representing Distance and Bearing of a Target

FIG. 7 shows that the device can be used to communicate the direction (bearing) and the distance (range) of a target to the subject. As the target approaches, the patch of active actuators enlarges, with the average direction of the patch of active actuators pointing towards the target. This methodology has limitations, for example, as the target approaches, the number of active actuators increases resulting in a decrease in the directionality and accuracy of the device in pointing to the object. Further, multiple approaching objects may not be tracked with this method because as individual objects approach, their respective active actuator patches merge creating a single large patch that no longer represents the initial individual objects. The latter limitations may be dealt with as follows:

Representing Distance by Turning Actuators On and Off:

Alternatively, instead of representing the location of an object with one or several continuously active actuators, a single actuator pointing in the direction of the object may be turned on and off at a certain or specified frequency depending on the distance of the object to the subject. As the object approaches, the on/off frequency is increased. When the object is very close to the subject, the frequency is maximal. As the object withdraws, the frequency is reduced.

By linking the distance of an object (to the subject) to the on/off frequency of actuators, multiple objects located at various distances from the subject may be tracked, each represented by a single actuator pointing in that direction and turning on and off at a frequency representing the distance of that object of the subject.

Representing Distance by Varying the Electrical Current Input to Actuators:

As an object approaches, the intensity of the current fed to an actuator pointing to the direction of the object may be increased thereby increasing the intensity of the stimulation impressed upon the skin. As an object withdraws, the electrical current is diminished. By controlling the electrical current fed to each actuator, multiple objects located at various distances from the subject may be tracked, each represented by a single actuator pointing to that object and operating at an intensity based on the current supplied to it which represents the distance of that object to the subject.

Semaphores Indicating Departure from the Vertical Axis

One application of this invention is as an aid to pilots in avoiding loss of horizon: a dangerous condition caused by bad weather, and low visibility, and resulting in disorientation and accidents. Loss of horizon occurs when all visual cues about the "up" and "down" directions are lost. Most aircraft are equipped with electronic navigational systems, including gyroscopes. A gyroscope keeps track of the horizon and the current attitude of the aircraft and, with the help of the onboard navigational systems, displays the horizon through an instrument called artificial horizon. However, in certain emergencies, a visual display of the horizon may be confusing to a pilot who must scan multiple instruments, under extreme workloads. The attitude of the aircraft may be represented by a vector aligned with the axis of the pilot's neck. The electronic navigational system of the aircraft can calculate the relative position of neck axis the vertical axis OZ, as depicted in FIG. 8.

Figure 8:
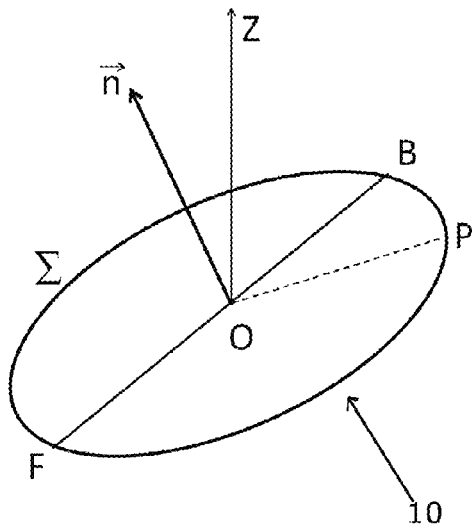
FIG. 8 is a depiction of a neck axis showing the location P of an actuator that turns on if the neck axis strays from the vertical axis Z.

FIG. 8 shows a neck axis, represented by vector $\vec{n}$, being tilted with respect to the vertical axis OZ, the actuator located at point P on the device 10 is activated indicating to the subject the direction the neck should be tilted to realign it with the vertical axis OZ. Point P is defined as the intersection of a vertical plane containing vector $\vec{n}$ and axis OZ, and the circle Σ.

Figure 9:
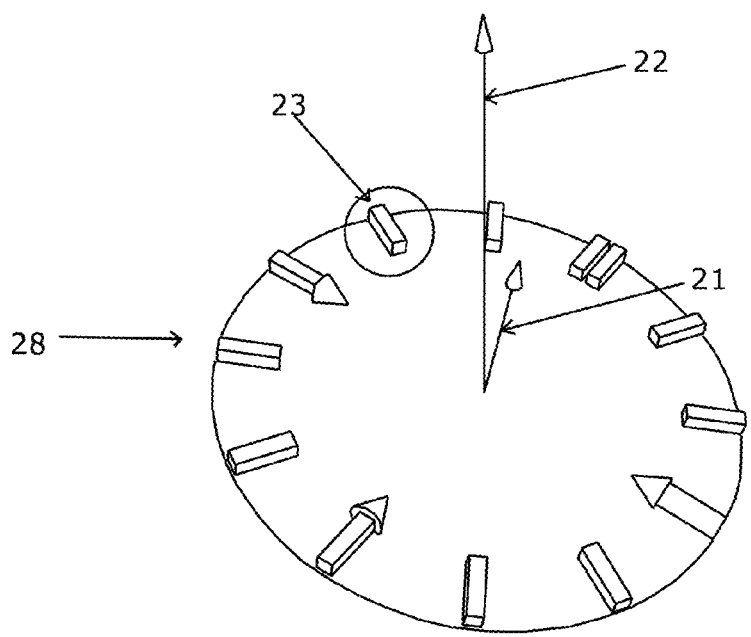
FIG. 9 is another depiction of a neck axis 21 corresponding to a device having twelve actuators and indicating the active actuator when the neck axis strays from the vertical axis 22.

FIG. 9 shows that as the neck axis, illustrated by vector 21 on clock face 28, is tilted with respect to the vertical direction indicated by vector 22, the actuator 23 is activated to indicate to the subject the direction in which the neck should be tilted to realign it with the vertical axis.

Semaphores for Representing Acceleration

Figure 10A:
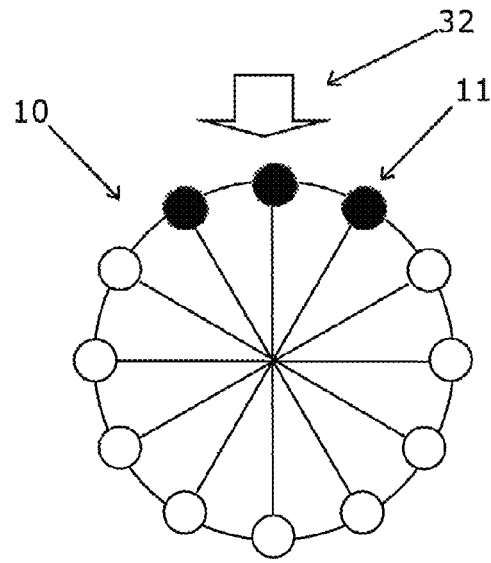
FIGS. 10A-10C are depictions of the expression of acceleration by the device of the invention.
Figure 10B:
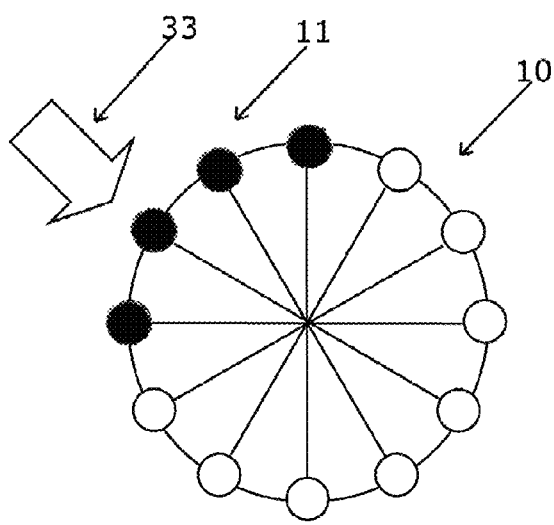
Figure 10C:
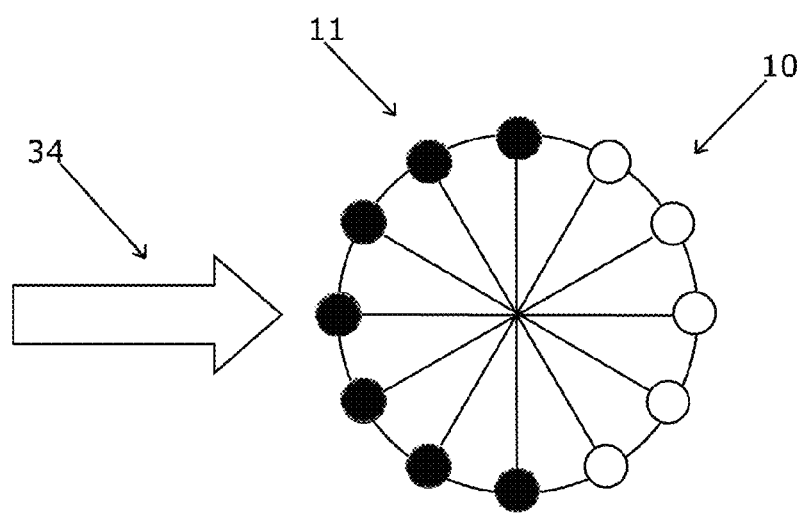

In racing games, the acceleration experienced by a player may not be easily conveyed with visual or auditory cues. The present invention may be used to convey the direction and intensity of acceleration, experienced in a game, to a player. FIGS. 10A-10C show that as the acceleration experienced by the user increases in intensity and changes direction, the patch of active actuators 11 increases in size as a function of the intensity of acceleration, and the average direction of the patch of active actuators points in the opposite direction of the acceleration vector (32, 33 and 34). Thus, the player experiences in-game acceleration as if a yoke placed around his neck drags and accelerates him in various directions, with the size and direction of the patch of active actuators, controlled by the game console, computer or mobile device, providing variable pressure to the neck skin by the actuators 11.

Construction of the Device

1. Micro-vibration motors as vibrating actuators. Small micro-vibration motors may be used as actuators in the device. Micro-vibration motors are used in mobile phones and pagers as silent alert mechanisms. As actuators in the device of the present invention, micro-vibration motors apply a localized vibration around the neck.
2. Pulse-operated motors to cause a gentle rub against the skin. When power is suddenly applied to an electric motor an initial torque is produced that forces the body (stator) of the motor to rotate counter to the direction of rotation of the rotor. This effect is used as a means to gently rub the body of the motor against the skin of the user. Each motor is fixed along its side, as shown in FIG. 5, which acts as a hinge when power is suddenly applied to the motor and causes it to rotate around the hinge-like structure. Pulse-operation of a motor consumes less electricity and may, in certain applications of the device, be more comfortable to the user.
3. Addition of a positioning mechanism to the device. An optical beacon using light-emitting diodes (LED's) may be placed on the device to enable a video camera working in concert with the video game system to locate the device and communicate the position and orientation (with respect to the video screen) of a player wearing the device to the video game system. The knowledge of the location and orientation (direction to which a layer is facing with respect to the video screen) allows for more complex and interesting video game designs.

Organized Tactile Patterns (Marquis Patterns) as a Means of Communicating Certain Sensations in a Simulated or Virtual Environment Referring to FIG. 11, Table 1 shows an example of repetitive marquis patterns causing a rotating point of contact around the neck of the subject. The organized tactile patterns herein are referred to as "Marquis Patterns" to represent the tactile "markings" or patterns created by the tactile communication device on the neck skin of the user. This particular pattern (Table 1) creates the sensation that the point of application of the stimulus is turning or rotating around the neck. Dark circles represent active actuators and the clear circles are inactive. The numbers indicate the sequence in which the actuators are activated.

Referring to FIG. 12, Table 2 shows an example of repetitive marquis patterns causing a sensation of back and forth movement of the pressure point of contact on the left and right sides of the neck of the subject. Dark circles represent active actuators and the clear circles are inactive. The numbers indicate the sequence in which the actuators are activated Referring to FIG. 13, Table 3 shows an example of marquis pattern causing a repetitive constriction around the neck of the subject resulting from the repetitive and simultaneous firing or activation of all actuators.

Such patterns and the sensations provoked to the player may be used as a way to convey certain game conditions to the subject. These conditions may be "diminishing health", "about to be shot by a virtual component", "falling" or "dying".

Referring to FIG. 14, Table 4 shows an example of a tactile alphabet based on the static patterns of tactile stimulation using 12 actuators placed at regular intervals around the neck.

Applications of the Invention

1. The device 10 (FIGS. 1-5) is worn around the neck in a manner similar to an unused pair of headphones at rest around the neck. The device 10 enables players of electronic video games to receive tactile feedback (pressure, vibration, temperature change or electrical discharge) around their neck through an array of actuators 11. Using this device 10, video game players can orient themselves, feel the direction of an oncoming object, feel acceleration, and sense certain game-specific situations such as health level, success, failure and death.
2. The device 10 is particularly useful when used in conjunction with controller-less video game systems such as Microsoft Xbox's KINECT system. Controller-less game systems allow one to interact with an electronic video game without the use of any gamepad, joystick, etc. Instead, several cameras and an image-processing software are used to identify the player and read the movement of his/her body parts as input to the video game. The device 10 enables video game players to receive tactile feedback around the player's neck when there are no hand-held controllers to convey tactile feedback through controller vibrations, for example.

3. The computer program runs on the controller and fires the actuators in a certain sequence generating patterns and sequences of tactile stimulation on the neck of the subject in order to communicate specified information or sensations to the subject.
4. The physical design of the device 10 ensures that the actuators 11 remain equidistant from each other, and stay snug and in direct contact with the neck skin as the device is adjusted to various neck sizes. The device 10 has a generally C-shaped design structure ensuring that it remains properly oriented around the neck 20 (FIG. 1) with the open end facing the front of the neck and the forward actuators bracketing the subject's Adam's apple as the subject moves or speaks. Further, the C-shaped design ensures that the subject's neck is not entirely surrounded by the device and does not feel "choked" by it. Throughout this application, the device 10 is shown with 13 actuators 11 with the two forward actuators 11 operating in unison at the 12 o'clock position. This design is equivalent to a fully closed design with 12 actuators 11.
5. The use of the neck 20 as a unique area of the human skin, and the exploitation of this uniqueness by stimulating it in a tactile fashion and from various angular or peripheral directions (FIG. 2) thereby enabling the subject to identify, with a high level of accuracy, combinations of tactile stimuli applied at the various angular or peripheral locations around the neck.
6. An alphabet (Table 4) of patterns of tactile stimulation with 12 actuators 11 placed at regular or equidistant intervals around the neck for the purpose of communicating with a subject wearing the device. In this alphabet, each letter is represented by certain combinations of active actuators, firing simultaneously or consecutively. This alphabet may be used to communicate with a subject who, for pathological or other reasons such as visual or auditory information overload, is unable to receive communications through normal visual or auditory channels.
7. The use of certain organized tactile patterns referred to as "marquis patterns" to convey certain sensations signifying certain states of a video game or certain conditions (Table 1 and Table 2). For instance, in an electronic video game, "falling from a height" may be represented by a sensation of a fast-rotating pressure point around the neck (Table 1). A sensation of fast back-and-forth movement of two pressure points on both sides of the neck (Table 2) may be used to convey a sensation of "Power Boost". Finally, the repetitive firing of all actuators (Table 3) may be used to convey the feeling of "losing" or "getting shot".
8. The device may be used to communicate with subjects unable to process text- or voice-based information due to autism or other neurological disorders. A small set of tactile semaphores based on the marquis patterns, or a simplified alphabet may be used, in conjunction with training and conditioning, to communicate with these individuals.
9. In an alternate design, the device may use several layers of actuators (FIG. 4) conferring to the device an additional dimension that may be used to convey a richer set of information to the subject.
10. The computer program controlling the device may be programmed to produce sequences of marquis patterns (Table 1, Table 2 and Table 3) that provide bio-feedback or a soothing neck message to the subject.
11. The device may be used to communicate with individuals who can't see or hear, for example, due to visual and auditory overload or impairment. In such cases, the device may be used, for instance, to guide a subject toward a target or warn a blind subject of the bearing and range of an oncoming quiet vehicle such as an electric or hybrid automobile.
12. Blind individuals are increasingly taking part in sports and leisure activities. To safely practice these activities, the blind individual must follow a guide who carries a small bell or speaks continuously so the blind subject can locate them. In ball sports, the ball emits a continuous sound to allow the blind to locate it. The device may be used in conjunction with a radio-transmitter carried by a guide or a ball, and a directional radio-receiver carried by the subject, to communicate both the bearing and range (direction and distance) of the guide or the ball to the subject using tactile patterns on the neck of the subject (FIG. 7).
13. The device can assist pilots, divers, skydivers or the like to recover their sense of up and down following disorientation due to a loss of visual and mental cues about the horizon. Loss of horizon is a serious concern and has been shown to be at the origin of many aviation and diving accidents. When the subject's neck axis is in the vertical direction, no stimulation is applied to the neck. When the subject's neck axis deviates from the vertical direction, tactile signals indicate to the subject the direction in which he or she must tilt their neck to realign it with the vertical direction (FIG. 8 and FIG. 9).
14. An optical LED beacon (not shown) may also be used with the device 10 of the invention. Video game systems may include a camera placed near video screens to look back at users or the video game players. The camera may communicate with the beacon and determine the location of device 10 and, thus, the user as well as the orientation of the device and user with respect to the camera and video screen. The knowledge of the location and orientation (direction to which a player is facing with respect to the video screen) allows for more complex and interesting video game designs.

Application of the Device Related to Video Gaming

1. Private communication with individual players. In multi-player video games where several players are physically located in front of the same system, screen and set of speakers, the device may be used by the video game system to communication privately with individual players. Private prompting and communication with individual players allows for more competitive, complex and interesting game designs.
2. Rewarding players. The device may be used by a video game system as a means to reward individual players with soothing tactile sensations around the player's neck. These tactile sensations may be produced as sequences of Marquis Patterns as shown and described herein.

Application of the Device as an Accompaniment to Music

A computer, video gaming system, personal music delivery device such as an iPod, or a public music delivery system may use the device to simultaneously deliver music and rhythmic organized tactile patterns to listeners.

An example of such an application is the use of the device as a tactile metronome delivering a complex beat pattern in the form of sequences of organized tactile patterns (Marquis Patterns). In this fashion, a musician may use the device as a tactile metronome to "feel" complex beats while playing his/her instruments.

Another application may be in a dance club or in a choir where dancers or singers wearing the device receive rhythmic organized tactile patterns along with the music helping them to dance or sing in unison.

Application of the Device as a Means for the Deaf to Sense Music

Using the device, music may be translated to patterns of tactile stimulations and impressed on the neck skin of a deaf person. Each note of a musical scale may be mapped to a specific actuator or group of actuators, which may be turned on and left on for a duration equal to the timing value of that specific note. In this fashion, the production of tactile patterns on the neck may be made synchronous to the music itself, and hearing individuals may hear and feel the music as a synchronous and complete musical experience.

To translate music into an intuitive tactile experience, contiguous notes may be mapped to contiguous actuators, for example, with higher-pitched notes mapped to the front of the neck (corresponding to the 12 o'clock position) and the lower-pitched notes mapped to the back of the neck (6 o'clock position). The tactile sensing of music may be made more pleasant by mapping each note simultaneously to pairs of symmetrical actuators located on the left and right side of the neck, thus providing the subject with a more symmetrical tactile experience.

Although the device of the present invention is shown and described for use with respect to a high-resolution sensory organ of a user, such as the neck skin, the device may also be utilized on other body parts which may exhibit less sensory resolution.

As many changes are possible to the tactile communication device embodiments of this invention, utilizing the teachings thereof, the description above and the accompanying drawings should be interpreted in the illustrative and not in the limited sense.

That which is claimed is:

1. A tactile communication device for positioning and contact around the neck of a user comprising:
    a) an elongated flexible structure and an extendable support structure to position a plurality of tactile actuators spaced in a generally planar orientation around and encircling the base of the neck of the user, each said tactile actuator positioned for generally equal contact pressure around and against the skin of the neck of the user and at predetermined positions inherently directional to the said elongated flexible structure having said spaced tactile actuators extending therefrom and encircling the entire base of the neck of the user, said extendable support structure disposed on the outside of said elongated flexible structure, said extendable support structure further having a generally C-shaped configuration with terminal ends for supporting said elongated flexible structure, said C-shaped support structure defining an opening for positioning and orienting said device about the neck of the user; and
    b) a control unit to actuate said tactile actuators to provide tactile communication to the skin of the neck of the user.

2. The tactile communication device of claim 1, wherein said control unit includes software programmed to provide marquis patterns and semaphores to said actuators.

3. The tactile communication device of claim 2, wherein said marquis patterns and semaphores represent depictions selected from the group of depictions consisting of the letters of the alphabet, numbers, musical notes, location of an object, speed of an object and the vertical orientation of the device when worn about the neck of the user.

4. The tactile communication device of claim 1, wherein said plurality of actuators form a clock face arrangement about the neck of the user to provide inherently directional actuator positions to the user and wherein said actuators are selected from the group of actuators consisting of solenoids, micro-vibrators, buzzers, motors, speakers, electrical discharge and hot/cold sources.

5. The tactile communication device of claim 1, wherein said actuators are pulse operated motors, each mounted along an off-center axis for rotation about said axis.

6. The tactile communication device of claim 1, wherein an optical beacon is mounted to said device to provide a positioning mechanism.

7. The tactile communication device of claim 1, wherein each said actuator is operated by a variable electrical current.

8. The tactile communication device of claim 1, wherein music note coordination is provided in communication with said actuators to provide tactile stimulation patterns to the neck skin of the user in synchronization with musical notes.

9. A tactile communication device for encircling and for contact with the neck skin of a user comprising:
    a) an elongated extendable and flexible holster structure with an inner surface and an outer surface and having opposing ends:
    b) a plurality of actuators disposed about and extending from said inner surface of said elongated extendable and flexible holster structure, said actuators being constructed and arranged generally equidistantly from each other in a generally planar circular configuration for contact with the skin of and disposed around the entire neck of the user when said device is positioned around the neck of the user;
    c) an extendable support structure disposed on the outside of said elongated extendable flexible holster structure, said extendible support structure having terminal ends for holding said opposing ends of said elongated extendable flexible holster structure and to form said generally planar circular configuration, said extendable support structure providing adjustability of said holster structure to accommodate various neck sizes and to provide equal pressure against, and around the neck skin, said elongated extendable and flexible holster structure being constructed to maintain the equidistant spacing and orientation of the actuators about the user's neck; and
    d) a housing mounted to said extendable support structure for containing electronic elements in communication with said actuators.

10. The tactile communication device of claim 9, wherein said actuators disposed and held in said generally planar circular configuration about the neck of the user forming a clock face configuration having 13 actuators with one actuator disposed at each said opposing end of said elongated extendable and flexible holster structure for positioning adjacent the Adam's apple of the user.

11. The tactile communication device of claim 9, wherein software is provided and wherein said device is controlled by said software to convert external signals to actuator activity and wherein said actuators are constructed and arranged to provide touch, temperature change, vibration, and an electrical discharge.

12. The tactile communication device of claim 11, wherein said software is adapted to convert external activity into marquis patterns and semaphores to said actuators.

13. The tactile communication device of claim 9, wherein said actuators are formed of an elongated, generally cylindrical structures and are axially disposed on said inner surface of said elongated extendable and flexible holster structure.

14. The tactile communication device of claim 13, wherein said actuators are comprised of pulse operated micro-vibration motors.

15. The tactile communication device of claim 9, wherein an optical beacon is mounted to said device to provide a positioning mechanism.

16. The tactile communication device of claim 9, wherein said electronic elements turn each said actuator on or off.

17. The tactile communication device of claim 9, wherein each said actuator is operated by an electrical current and wherein a variable electrical current output is provided for communication with said actuators.

18. The tactile communication device of claim 9, wherein music note coordination is provided in communication with said actuators to provide tactile stimulation patterns to the skin of the user in synchronization with musical notes.

19. A tactile communication device for encircling the neck of a user comprising:

a) an adjustable skeleton support structure having a sleeve and curved support members slidably extending therefrom, said support members each having a terminal end, b) a length of a flexible material held at said terminal ends of said skeleton support structure, said length of flexible material having an inner surface, c) a plurality of spaced tactile actuators extending from said inner surface of said length of flexible material, wherein said plurality of spaced tactile actuators include terminal end tactile actuators positioned at each said terminal end of said skeleton support structure for positioning adjacent the Adam's apple of the user and to thereby properly orient the device about the user's neck, d) a housing mounted on said skeleton structure for containing electronic elements in communication with said tactile actuators, whereby the positioning of said device about the neck of the user provides equally spaced tactile actuators providing equally pressured tactile communication encircling the entire neck skin of the user.

\* \* \* \* \*